United States Patent Office 2,942,992
Patented June 28, 1960

2,942,992

VITRIFIABLE INORGANIC CERAMIC BINDER AND SILVER COMPOSITIONS CONTAINING SAME

Maurice E. Dumesnil, Metuchen, N.J., assignor to E. I. du Pont de Nemours and Company, Wilmington, Del., a corporation of Delaware No Drawing. Filed May 3, 1957, Ser. No. 656,759

14 Claims. (Cl. 106—48)

This invention relates to new and improved vitrifiable inorganic ceramic binders, new and improved silver compositions containing the same, and ceramic bodies containing, firmly fused to the surface thereof, such improved silver inorganic ceramic binder compositions.

Vitrifiable inorganic ceramic binders have long been used in the ceramic arts as glazes, coatings, decorations and, in admixture with finely divided silver, for the production of bonding compositions, or as electric current carrying conductors on ceramic dielectric bodies.

In Knox Patent No. 2,385,580 are disclosed vitrifiable inorganic ceramic binders and silver compositions containing the same in which the inorganic ceramic binder is composed of 95% to 50% of bismuth trioxide and 5% to 50% of a lead-borosilicate frit. The copending applications of Oliver A. Short, Serial No. 448,374, now Patent No. 2,819,170 and William R. Larsen and Oliver A. Short, Serial No. 448,375, now Patent No. 2,853,393, both filed August 6, 1954, disclose similar compositions containing 95% to 50% of bismuth trioxide and 5% to 50% of a cadmium-borosilicate or alkali metal cadmium-borosilicate frit. These compositions are very useful as vitreous binders for bonding silver particles to barium titanate and other ceramic bodies generally used at the time of filing of those cases.

More recently there have been developed in the dielectric arts new and improved dielectric bodies having a controlled temperature coefficient and a low power factor. Such dielectric bodies are composed of high percentages of titanium oxide, magnesium silicate, zirconium silicate, and the like. Vitreous inorganic ceramic binders and silver compositions containing the same that were known prior to this invention were not generally satisfactory for use with the more recently developed dielectric bodies. Previously known vitreous inorganic ceramic binders did not adhere well to the newer dielectric materials and were not always wetted with solders used in bonding the silver to lead wires and the like.

It is an object of this invention to produce a new and improved vitrifiable inorganic ceramic binder.

It is another object of this invention to produce a new and improved composition comprising a vitrifiable organic ceramic binder and finely divided silver.

It is a still further object of this invention to provide a new and improved fusible inorganic ceramic binder comprising an improved vitrifiable frit and finely divided silver which when fired on a ceramic body, particularly on ceramic dielectric bodies containing a high percentage of $TiO_2$, will adhere tightly and will be readily wetted with solder.

Other objects will appear hereinafter.

The new and improved inorganic ceramic binder of the present invention comprises between 95% and 50% of bismuth trioxide ($Bi_2O_3$) and between 5% and 50% of an alkali metal bismuth borosilicate frit containing between 2% and 10% alkali metal oxide, between 35% and 75% $Bi_2O_3$, between 5% and 15% $B_2O_3$, between 9% and 32% $SiO_2$, and between 0% and 35% CdO.

The new and improved silver composition of this invention comprises finely divided silver particles and finely divided particles of the above-described binder in a vehicle, the proportion of silver to binder in the composition being between 3:1 and 20:1, by weight. This new silver composition can be applied to ceramic structures, including the new low power factor, low dielectric constant, high $TiO_2$ dielectric structures, and fired to fuse the binder and firmly bond the silver to the ceramic. Such bonded silver can be soldered without previous burnishing or copper-plating.

As stated above, the inorganic ceramic binder of this invention must contain between 95% and 50% of bismuth trioxide and between 5% and 50% of an alkali metal bismuth borosilicate glass frit. It is to be understood, of course, that besides the bismuth trioxide and the alkali metal bismuth borosilicate frit, the binder may contain minor percentages of other materials of the type commonly found in vitrifiable frits and glasses. It is essential, however, that the above-mentioned ingredients be present within the above-defined ranges and that other materials in the binder, for example, ZnO, CaO, BaO, MgO, $TiO_2$, $ZrO_2$, $Al_2O_3$, or $Sb_2O_3$, be present in total quantity not greater than 15% of the total weight of the binder.

The alkali metal bismuth borosilicate frit, as above stated, must contain between 2% and 10% of an alkali metal oxide. Although, based on the total weight of the binder, this is a very small percentage, it is essential that it be present to obtain a commercially workable inorganic ceramic binder. The alkali metal oxide may be sodium, potassium, or lithium oxide, or mixtures thereof; however, from a standpoint of superior adherence to ceramic bodies and the production of silver coatings having a low power factor sodium oxide is preferred. In place of alkali metal oxides, alkali metal compounds such as carbonates, which are converted to the oxides at the fusion temperature of the flux, may be used.

The frit must contain 35% to 75% bismuth trioxide. By reason of this high content of bismuth trioxide in the glass frit, the total weight of the binder may contain to exceed 98% bismuth trioxide. This difference over the previously known vitrifiable binders above referred to makes the binder of this invention greatly superior for the purpose of more tightly bonding the finely divided silver to ceramic bodies, particularly the low dielectric constant, high $TiO_2$ ceramic bodies.

The frit must contain between 8% and 32% of $SiO_2$ and may contain, if desired, up to 35% CdO. The cadmium oxide is not required to produce tightly bonded silver layers on ceramic bodies; however, if such silver layers are not soldered to lead wires or other metallic or electrical elements within two or three days of firing of the silver composition, the solder wetting of the silver coatings may be reduced. The addition of a small percentage, up to 35%, of CdO will materially eliminate such reduction of solder wetting. Furthermore, at least 80% of the frit constituents should consist of said alkali metal oxide, bismuth oxide, boron oxide, silica and cadmium oxide.

In preparing the inorganic ceramic binder of this invention, bismuth subnitrate may, for example be substituted for bismuth trioxide since it will be converted to the trioxide in fusing. Likewise, and for the same reasons, cadmium oxide may be replaced by cadmium carbonate, boric oxide by boric acid, borax or equivalent boron compound, and silicon dioxide by silicates which will be converted at the fusion temperature to $SiO_2$. If desired, alkali metal borates or alkali metal silicate can supply the required amounts of alkali metal oxide, boron oxide, or silicon oxide.

The alkali metal bismuth borosilicate frit is produced by mixing together the required frit ingredients and melting the same to a liquid melt and pouring the same into water, the fritted material is then ball-milled in water, and dried.

The ball-milled frit is then mixed with similarly finely divided bismuth trioxide, bismuth subnitrate, or commercial bismuth oxide in the required proportions that the bismuth compound calculated as bismuth trioxide ($Bi_2O_3$) is present in an amount between 95% and 50% of the total weight, and the alkali metal bismuth borosilicate frit is present in an amount between 5% and 50% of the total weight. This mixture can be used as such in the form of 20-mesh or finer material in preparing the silver composition, or it can first be sintered to a temperature of between 650° C. and 850° C. for a period of thirty minutes to two hours and then ball-milled in water for a period of one and one-half to six hours, and dried. Such sintering and ball-milling will produce a material having a particle size of about 100-mesh or finer.

The silver composition is produced by dispersing in a liquid vehicle between three and twenty parts by weight of finely divided silver (preferably 200- to 325-mesh) for each part of the above-described finely divided inorganic ceramic binder.

The silver particles may be in the form of metallic silver, or in the form of silver carbonate or silver oxide, or in any other form which in firing at the temperatures employed will be converted to metallic silver. Therefore, the terms "silver," "silver particles," or "finely divided silver," as used throughout this specification and the claims appended hereto in connection with the silver composition before it is fired, are meant to include silver in any form which in firing will be converted to metallic silver.

As a vehicle, a wide variety of materials may be used. The vehicle functions to hold the silver particles and binder particles together and in good admixture, and simplifies application of the composition to a ceramic object on which it is to be fired. Almost any liquid can be used which will not chemically react with the binder particles to a substantial extent, and which will not prevent the production of metallic silver during the firing operation. Substances such as turpentine, varnish, turpentine-varnish combinations; pine oil, with or without rosin; drying oils, for example, linseed oil; volatile organic vehicles, for example, alcohols, particularly alcohols having one to eight carbon atoms; ketones, for example, acetone; esters, for example, amylacetate; ethers, for example, methyl ether of ethylene glycol. Water or water-alcohol mixtures can be used. Thermofluid vehicles of the type disclosed in Jessen U.S. Patents Nos. 2,607,701 and 2,607,702 may be used to good effect. Also, liquid vehicles consisting essentially of polymerizable materials as described in the copending application of L. C. Hoffman, Serial No. 571,875, may also be used, if desired. Under some circumstances, organic binders such as polyvinyl alcohol, polyvinyl acetate, nitrocellulose, ethyl cellulose, or the like, may be added to the liquid vehicle used.

The silver composition may be applied to the ceramic bodies in any desired manner. For example, it may be applied by spraying, brushing, dipping, or by screen stenciling. The method of application, and the thickness of coating desired, will determine to a large extent the proportion of liquid vehicle in the composition. The coating may be applied from a melt that will set up immediately or, if the vehicle is an air-drying vehicle, it may be dried at room temperature or at an elevated temperature up to about 150° C.

When the ceramic object is porcelain or a refractory dielectric such as high titania, low dielectric constant body, the firing temperature should be between 1200° F. and 1500° F. for a period of ten minutes to one hour, depending upon the composition of the ceramic.

The fired ceramic objects will have a metallized surface which will readily accept solder without previous burnishing or copper-plating.

The soldering of metal objects to the metallized coatings above described is preferably accomplished with the commonly known soft solder containing approximately equal parts of lead and tin. Such solders may, however, contain small amounts of other metals, for example, silver, as used in known soldering compositions.

The metal-to-ceramic bond produced in accordance with the present invention has a high tensile strength which, in some cases, is limited only by the strength of the ceramic to which the metal is bonded. By bonding ceramic to metal in accordance with this invention, measured bond strengths as high as 900 pounds per square inch have been obtained.

The metal-to-ceramic bond produced with the silver binder composition of the present invention has a considerably higher bond strength with high $TiO_2$ dielectrics than any silver composition heretofore known, including those of the above-mentioned Knox patent and Short applications. Moreover, these binders are much less corrosive than the cadmium borosilicate frit binders of the above-mentioned Short and Larsen and Short applications.

The following examples are given for the purpose of setting forth, in detail, several preferred inorganic ceramic binders and silver compositions containing the same, and preferred methods of producing electrically-conducting, solderable silver layers on high dielectric constant dielectric bodies.

*Example 1*

An alkali metal-bismuth-cadmium-borosilicate frit is prepared by mixing together 210 parts bismuth trioxide ($Bi_2O_3$), 57.6 parts of cadmium oxide (CdO), 70.2 parts silica ($SiO_2$), and 91.2 parts borax ($Na_2B_4O_7 \cdot 10H_2O$), melting the mixture at a temperature of 1200° C. and pouring the melt into water of room temperature. The composition of the resulting frit, after drying, was 3.8% $Na_2O$, 54.4% $Bi_2O_3$, 14.9% CdO, 18.2% $SiO_2$, and 8.7% $B_2O_3$.

The frit was ball-milled in water to a fine powder (about 200-mesh) with this powder mixed with about four times its weight of similarly finely-divided bismuth trioxide. The resulting inorganic ceramic binder, i.e., bismuth trioxide-frit mixture was dispersed with finely divided (about 200-mesh) silver, in a vehicle composed of 10% ethyl cellulose, 21% hexylene glycol and 66% carbitol acetate, and about 1% each of phosphorated tall oil, diethyl-oxalate and a manganese resinate. Manganese resinates are the reaction products of a manganese salt and an organic material such as 2-ethylhexoic acid, stearic acid, linoleaic acid, naphthenic acid, rosin or the like. The manganese content of such resinates is usually about 4% to 10%, by weight.

The percentages by weight of silver, binder and vehicle in the dispersion were as follows:

| | Percent |
|---|---|
| Finely divided silver | 50.8 |
| Finely divided binder | 11.2 |
| Vehicle | 38.0 |

Capacitors prepared by screen stenciling the above silver composition onto titanium dioxide dielectric chips 0.5 mm. thick and having a dielectric constant (K) of about 100, so as to provide a circular electrode area 1.1 cm. in diameter in a muffle furnace for a period of two hours had a capacitance of about 150 mmf. and a power factor of 0.05%.

The fired-on silver coatings on the above chips, when fluxed with a common rosin solder flux, e.g., rosin in ethyl alcohol, were readily wet by solder containing 62% tin, 36% lead, and 2% silver. A pull of at least 10 lbs. was required to dislodge a soldered-on copper lead wire when the pull was in a direction parallel to the face of the titanium dioxide chip. The fired-on silver coatings of this example were generally 100% more adherent to $TiO_2$ chips than those of similar capacitors prepared using similar silver compositions whose binder is prepared with the cadmium borosilicate frits of the Short and Larsen and Short applications above referred to or the lead borosilicate frits of said Knox patent.

The capacitance, power factor and silver adherence of the capacitors produced in accordance with this example were uniformly constant when fired at a temperature varying from 1350° F. to 1500° F. Thus, large variations in the firing temperature will not appreciably affect the electrical or adherence properties of these capacitors.

The addition of up to 1% of the manganese resinate to the vehicle in the silver composition was found to improve the solder wettability of the fired silver coating without affecting the electrical and adherence properties.

*Example II*

A sodium-bismuth-borosilicate frit was prepared by melting at 1200° C. 140 parts of bismuth trioxide, 72 parts silica, and 95 parts borax ($Na_2B_4O_7 \cdot 10H_2O$) and pouring the melt into water. The composition of the resulting frit after drying was 8.5% $Na_2O$, 52% $Bi_2O_3$, 24.7% $SiO_2$, and 15.3% $B_2O_3$, and then dispersed with $Bi_2O_3$ and finely divided silver in the vehicle in accordance with the details of Example I to produce a silver composition.

Capacitors prepared as in Example I using the silver composition of this example were comparable in electrical properties, in adherence, and subject to similar variations in firing temperature as the capacitors of Example I. The solder wettability of the silver coating of the capacitors of this example was considerably reduced after aging for two or three days. As above explained, this is due to omission of a small percentage of CdO from the frit used in preparing the binder of this example.

*Example III*

A lithium-bismuth-cadmium-borosilicate frit was prepared by melting at 1200° C. 210 parts bismuth trioxide, 57.6 parts cadmium oxide, 62.4 parts of lithium tetraborate ($Li_2B_4O_7 \cdot 5H_2O$) and 70.2 parts silica, and pouring the melt into water. The composition of the resulting frit after drying was 68.1% $Bi_2O_3$, 18.7% CdO, 2.3% $Li_2O$, and 10.9% $B_2O_3$. This frit was mixed with $Bi_2O_3$ and then dispersed with finely divided silver in the vehicle in accordance with the details of Example I to produce a silver-flux vehicle composition.

Capacitors prepared as in Example I using the silver composition of this example were comparable in electrical properties, in adherence, and subject to similar variations in firing temperature as the capacitors of Example I with the exception that the capacitors of this example had a slightly higher power factor.

*Example IV*

Example III was repeated using in place of the lithium tetraborate 77.4 parts of potassium borate ($K_2B_2O_4$). Capacitors so prepared were very similar to those of Example III but had substantially the power factor of those of Example II.

Throughout the specification and claims, percentages, parts and proportions refer to percentages, parts and proportions by weight unless otherwise specified.

Although, as above described, the inorganic ceramic binder and silver compositions of this invention have special utility for the bonding of ceramic to metal, and particularly high $TiO_2$ content dielectric bodies to metal lead wires, the utility of these materials is obviously not limited thereto. The present invention is, therefore, not to be limited to the specifically described uses. Furthermore, it is obvious that many changes and modifications can be made in the above-described details without departing from the nature and spirit of the invention. It is, therefore, to be understood that the invention is not to be limited to the above-described details except as set forth in the appended claims.

I claim:
1. An alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide.

2. An alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said alkali metal oxide, bismuth trioxide, boron oxide, silica, and cadmium oxide constituting at least 80% of said frit.

3. A vitrifiable inorganic ceramic binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide.

4. A vitrifiable inorganic ceramic binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said bismuth trioxide and said alkali metal-bismuth-borosilicate frit constituting at least 85% of said binder.

5. A vitrifiable inorganic ceramic binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said alkali metal oxide, bismuth trioxide, boron oxide, silica, and cadmium oxide constituting at least 80% of said frit.

6. A vitrifiable inorganic ceramic binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said bismuth trioxide and said alkali metal-bismuth-borosilicate frit constituting at least 85% of said binder, and said alkali metal oxide, bismuth trioxide, boron oxide, silica, and cadmium oxide constituting at least 80% of said frit.

7. A silver-vitrifiable inorganic ceramic binder composition comprising finely divided silver and binder particles dispersed in a vehicle in a proportion by weight of silver to binder between 3:1 and 20:1 (the weight of silver being the weight of metallic silver in the silver particles), said binder consisting essentially of between 95% and 50% bismuth trioxide and between 5% and 50% of an alkali metal-bismuth-boro-silicate frit consisting essentially of between 2% and 10% alkali metal oxide, between 35% and 75% bismuth trioxide, between 5% and 15% boron oxide, between 9% and 32% silica, and between 0% and 35% cadmium oxide.

8. A silver-vitrifiable inorganic ceramic binder composition comprising finely divided silver and binder particles dispersed in a vehicle in a proportion by weight of silver to binder between 3:1 and 20:1 (the weight of silver being the weight of metallic silver in the silver particles), said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said bismuth trioxide and said alkali metal-bismuth-borosilicate frit constituting at least 85% of said binder.

9. A silver-vitrifiable inorganic ceramic binder composition comprising finely divided silver and binder particles dispersed in a vehicle in a proportion by weight of silver to binder between 3:1 and 20:1 (the weight of silver being the weight of metallic silver in the silver particles), said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said alkali metal oxide, bismuth trioxide, boron oxide, silica, and cadmium oxide constituting at least 80% of said frit.

10. A silver-vitrifiable inorganic ceramic binder composition comprising finely divided silver and binder particles dispersed in a vehicle in a proportion by weight of silver to binder between 3:1 and 20:1 (the weight of silver being the weight of metallic silver in the silver particles), said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said alkali metal-bismuth-borosilicate frit constituting at least 85% of said binder, and said alkali metal oxide, bismuth trioxide, boron oxide, silica, and cadmium oxide constituting at least 80% of said frit.

11. A ceramic body containing firmly fused to the surface thereof a silver-inorganic ceramic binder composition comprising finely divided silver in a vitreous binder, the proportion of metallic silver to binder being between 3:1 and 20:1, said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide.

12. A ceramic body containing firmly fused to the surface thereof a silver-inorganic ceramic binder composition comprising finely divided silver in a vitreous binder, the proportion of metallic silver to binder being between 3:1 and 20:1, said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said bismuth trioxide and said alkali metal-bismuth-borosilicate frit constituting at least 85% of said binder.

13. A ceramic body containing firmly fused to the surface thereof a silver-inorganic ceramic binder composition comprising finely divided silver in a vitreous binder, the proportion of metallic silver to binder being between 3:1 and 20:1, said binder consisting essentially of between 95% and 50% bismuth trioxide and between 5% and 50% of an alkali metal-bismuth-borosilicate frit consisting essentially of between 2% and 10% alkali metal oxide, between 35% and 75% bismuth trioxide, between 5% and 15% boron oxide, between 9% and 32% silica, and between 0% and 35% cadmium oxide, said alkali metal oxide, bismuth trioxide, boron oxide, silica and cadmium oxide constituting at least 80% of said frit.

14. A ceramic body containing firmly fused to the surface thereof a silver-inorganic ceramic binder composition comprising finely divided silver in a vitreous binder, the proportion of metallic silver to binder being between 3:1 and 20:1, said binder consisting essentially of between 95% and 50% bismuth trioxide and between 5% and 50% of an alkali metal-bismuth-borosilicate frit consisting essentially between 2% and 10% alkali metal oxide, between 35% and 75% bismuth trioxide, between 5% and 15% boron oxide, between 9% and 32% silica, and between 0% and 35% cadmium oxide, said bismuth trioxide and said alkali metal-bismuth-borosilicate frit constituting at least 85% of said binder, and said alkali metal oxide, bismuth trioxide, boron oxide, silica, and cadmium oxide constituting at least 80% of said frit.

References Cited in the file of this patent
UNITED STATES PATENTS

| | | |
|---|---|---|
| 2,385,580 | Knox | Sept. 25, 1945 |
| 2,584,974 | Armistead | Feb. 12, 1952 |
| 2,726,161 | Beck et al. | Dec. 6, 1955 |
| 2,822,279 | Larsen et al. | Feb. 4, 1958 |
| 2,853,393 | Beck et al. | Sept. 23, 1958 |

UNITED STATES PATENT OFFICE
CERTIFICATE OF CORRECTION

Patent No. 2,942,992                                      June 28, 1960

Maurice E. Dumesnil

It is hereby certified that error appears in the printed specification of the above numbered patent requiring correction and that the said Letters Patent should read as corrected below.

Column 3, line 24, for "200-" read -- 20- --; column 4, line 17, for "strengthens" read -- strengths --; line 46, for "with", first occurrence, read -- and --; column 8, line 10, for "silicia" read -- silica --.

Signed and sealed this 11th day of April 1961.

(SEAL)

Attest:

ERNEST W. SWIDER
Attesting Officer

ARTHUR W. CROCKER
Acting Commissioner of Patents